United States Patent [19]
Taguchi et al.

[11] 3,899,789
[45] Aug. 12, 1975

[54] EXPOSURE CONTROL SYSTEM IN A PHOTOGRAPHIC CAMERA

[75] Inventors: Tatsuya Taguchi, Tokyo; Takashi Uchiyama, Yokohama; Soichi Nakamoto, Machida; Tadashi Ito, Yokohama, all of Japan

[73] Assignee: Canon Kabushiki Kaisha, Tokyo, Japan

[22] Filed: Dec. 4, 1973

[21] Appl. No.: 421,540

[30] Foreign Application Priority Data
Dec. 9, 1972  Japan.............................. 47-123633

[52] U.S. Cl.................... 354/30; 354/43; 354/51; 354/60 R
[51] Int. Cl............................................. G03b 7/08
[58] Field of Search............ 354/24, 26, 28, 29, 30, 354/36, 37, 38, 39, 40, 41, 43, 46, 48, 50, 51, 52, 53, 60, 61

[56] References Cited
UNITED STATES PATENTS

| | | |
|---|---|---|
| 3,554,104 | 1/1971 | Winkler ............................. 354/39 |
| 3,555,986 | 1/1971 | Pawlik .............................. 354/30 |
| 3,563,153 | 2/1971 | Watanake ........................ 354/43 |
| 3,593,629 | 7/1971 | Rentschler ...................... 354/29 |
| 3,611,893 | 10/1971 | Starp................................ 354/29 |
| 3,695,158 | 10/1972 | Fahlenberg ..................... 354/36 |
| 3,829,867 | 8/1974 | Ono .................................. 354/29 |

FOREIGN PATENTS OR APPLICATIONS
1,072,361   6/1967   United Kingdom................. 354/36

*Primary Examiner*—Joseph F. Peters, Jr.
*Attorney, Agent, or Firm*—William R. Woodward

[57] ABSTRACT

In a single-lens reflex camera having an electronic shutter of the fully-open aperture TTL metering type, an exposure control system includes a first exposure operating circuit for determining an aperture value in accordance with the setting of exposure time to control the exposure with priority given to shutter speed, an automatic aperture mechanism for presetting an aperture value, and a second exposure operating circuit for determining an exposure time in accordance with the preset aperture value and with the quantity of light from an object to be photographed.

2 Claims, 6 Drawing Figures

EXPOSURE CONTROL SYSTEM IN A PHOTOGRAPHIC CAMERA

BACKGROUND OF THE INVENTION

1. Field of the Invention

This invention relates to an exposure control system in a single-lens reflex camera. 2. Description of the Prior Art Single-lens reflex cameras are known which contain an exposure meter for metering light through a fully-open aperture of a lens to determine an exposure.

Also, in the cameras provided with an electronic shutter, it is usually the practice to preset an aperture value and automatically determine a shutter speed in accordance with the preset aperture value and the brightness of an abject to be photographed. In this case, however, the photographer would feel uncertain as to whether the shutter speed so determined is suitable for snap-shooting because he does not know it beforehand, or when the object is in motion, a relatively long exposure time would be provided to produce unclear pictures.

To overcome these disadvantages, there have heretofore been proposed cameras provided with an exposure control system whereby any desired shutter speed is first preset and then, an automatic aperture mechanism determines an aperture value in accordance with the preset shutter speed, thereby automatically determining an exposure time in accordance with the aperture value and with the brightness of the object to be photographed. These are known from for example, British Pat. No. 1,142,994 and Japanese Pat. Publication No. 8669/1966, but none of them is related to single-lens reflex cameras or directed to the TTL metering. Rather, they are designed such that the lens aperture is actually stopped down in accordance with a set exposure time and in response thereto, an aperture in front of a metering element is stopped down and the aperture value is introduced into a stop-down time control circuit to control the shutter speed.

Also, exposure control systems of the shutter-priority type for use in single-lens reflex cameras of the TTL metering type are known from Japanese Pat. Publication No. 18461/1966 and Published German Pat. application No. 2,133,212, but these are of the so-called stopped-down aperture TTL metering type in which the aperture of the objective lens is automatically determined by the shutter speed setting and the metering is effected through such aperture, and the fully-open aperture metering can not be affected with these systems.

SUMMARY OF THE INVENTION

It is an object of the present invention to provide, in a single-lens reflex camera using an interchangeable lens provided with a conventional aperture preset mechanism and having an electronic shutter, an exposure control system whereby shutter speed is preset to any desired value, metering is effected through the fully-open aperture of the lens to automatically preset an aperture, and then an accurate exposure time is determined in accordance with the preset value and with the quantity of light passed from an object to be photographed through the fully-open aperture to a metering element.

It is another object of the present invention to enable the exposure time to be set after determination of the aperture in a camera provided with the exposure control system of the described type.

To achieve these objects, the present invention is constructed such that an output from a first exposure operating circuit controls an automatic aperture mechanism in accordance with a preset exposure time and with the quantity of light passed through an objective lens to thereby determine the stopped position of an aperture preset ring and set an aperture value while, at the same time, varying the value of an information input element such as exposure time controlling variable resistor or the like so as to correspond to the set aperture value, whereafter a second exposure operating circuit controls the exposure time in accordance with the output of a storage circuit having stored therein said quantity of light and with the value of said information input element.

The invention will become more fully apparent from the following detailed description thereof taken in conjunction with the accompanying drawings.

DESCRIPTION OF THE PREFERRED EMBODIMENTS

Figure 1:
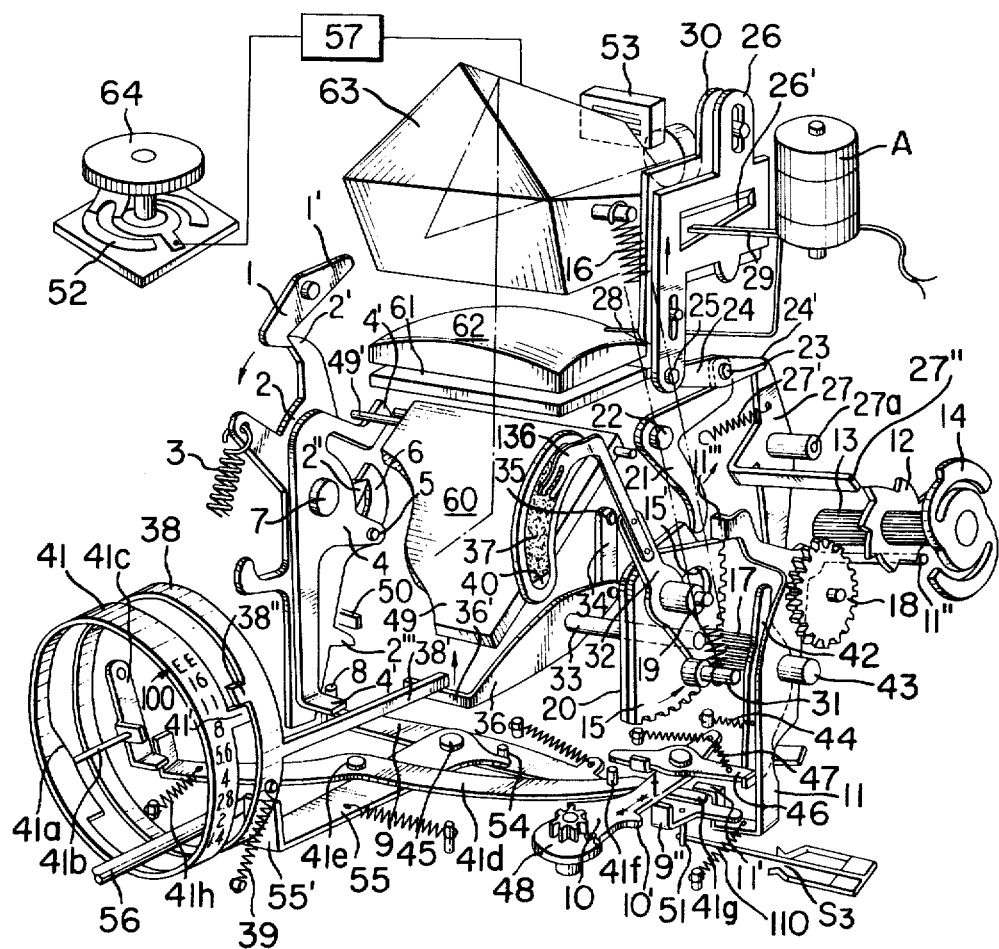
FIG. 1 is a perspective view of the interior mechanism of a single-lens reflex camera provided with the system according to an embodiment of the present invention.

In FIG. 1, the camera is shown in the position where the winding has been completed. In the exposure control circuit of the present invention, a light receiving element 53 is disposed at such a location that it receives light passed through a viewfinder's optical system comprising an unshown objective lens, a mirror mechanism 60, a focusing screen 61, a condenser lens 62, a pentaprism 63 and so on.

Where exposure is to be effected with priority given to shutter speed, an aperture set ring 41 mounted concentrically with the optical axis of the objective lens is set so that a mark EE thereon is coincident with a fixed index mark 100. Then, the shutter speed is set to a desired value by turning a dial 64, thus determinging the resistance value of a variable resistor 52 in a first exposure operating circuit 1 shown in FIG. 3.

Depression of an unshown shutter button closes a power switch S1 and the deviation needles of needless of a meter A are determined by the resistance value of the light receiving element which in turn is determined by the resistance value of the variable resistor 52 and the quantity of light from the object to be photographed, whereby a meter needle 28 indicates the determined aperture value within the viewfinder while the aperture value is preset in the lens by an automatic aperture mechanism in accordance with the deviated position of another needle 29 as will be described further, and also such aperture value is set in an exposure time controlling variable resistor 37.

More specifically, depression of the unshown shutter button actuates one end 1' of a release lever 1 to relase a main lever 2 from restraint. The main lever 2 is thus pulled and rotated by a spring 3 in the direction of arrow, thereby rotating a mirror lift lever 4 having a pawl member 6 mounted thereon by means of a pin 5. At the same time, the lever 4 actuates an interlocking lever 9 for rotation by an amount corresponding to a gap $t$ between the lever 9 and a sector gear 10 and accordingly, a clamp lever 11 is also rotated by a spring 110 in the same direction so that one end 11'' of the lever 11 releases a stop wheel 12 of a governor mechanism while another end 11''' releases a sector gear 15.

Thus, the sector gear 15 is pulled by a spring 16 and rotated at a predetermined speed by a governor mechanism comprising a pinion 17, a gear 18, a pinion 13 and a governor member 14, and this in turn rotates a cam 20 mounted on a shaft 19 of the sector gear 15. As a result, a cam follower lever 21 pivotally mounted on a pin 22 is actuated by the cam 20 for movement in the direction of arrow, so than an equalizer 24 mounted on the lever 21 by means of a pin 23 is rotated about one end 24' thereof engaged with a stop lever 27 while a pin 25 at the other end of the equalizer raises a meter cam 26 in the direction of arrow until the cam is stopped with the needle clamped between the cam 26 and a needle stiffening plate 30.

After the needle has been clamped, continued rotation of the sector gear 15 subjects the equalizer 24 to the reaction resulting from the clamped needle so that the equalizer is rotated with one end 25 as the fulcrum to bring the other end 24' out of engagement with the stop lever 27. Thus, the stop lever 27 is pulled and rotated counter-clockwise by a spring 27' until the pawl 27'' of the stop lever 27 is engaged with the stop wheel 12 to stop the rotation of the lever 27, thereby locking the sector gear 15 interlocked therewith.

With the rotation of the sector gear 15, an arm 32 mounted on the shaft 19 of the sector gear is rotated so that a brush 136 attached to one end of the arm 32 slides on the exposure time controlling variable resistor 37. On the other hand, a signal lever 36 mounted on the arm 32 by means of a pin 33 has one end supported by a support arm 34 one end of which is pivotally connected to the camera body by means of a pin 35, so that the signal lever is pivotally moved up with the pin 35 as the fulcrum while the other end of the signal lever actuates a pin 38' on an aperture preset ring 38 for an interchangeable lens against the force of a spring 39 to rotate the aperture preset ring to a preset aperture value corresponding to the value as indicated by the meter needle 29. In other words, the meter cam 26, the cam 20 and other links are designed such that they are displaced to the preset lens aperture value in accordance with the aperture-indicating position of the meter needle 29 corresponding to a given film sensitivity and a selected shutter speed. Thus, a resistance value corresponding to the displacement of the aperture preset ring 38 may be derived from the brush 136 and resistor terminal 40.

Figure 3:
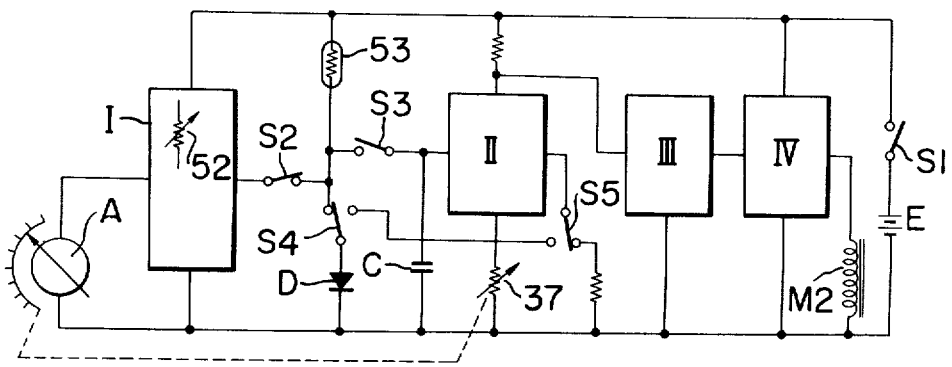
FIG. 3 is a diagram of the control network for the mechanism shown in FIG. 1.

Continued depression of the shutter button opens a switch S2 and closes a switch S3 in the control circuit of FIG. 3, so that the current passed through the light receiving element 53 is conducted through a diode D into a storage capacitor C for storage therein as a voltage.

When the stop lever 27 is disengaged from a return lever 42, the latter is rotated clockwise by the force of a spring 44 so that one end of the lever 42 actuates a lever 46 pivotally connected to the sector gear 10, thus releasing the interlocking lever 9 from the restraint imparted thereby by the projection 10' of the sector gear 10 through a delay governor 48.

When the interlocking lever 9 is released from the restraint, the main lever 2 biased by the spring 3 rotates the mirror lift lever 4, which in turn rotates the interlocking lever 9 about its pivot 45, so that a pin 54 provided on the interlocking lever 9 actuates to rotate a stop-down lever 55, one end 55' of which in turn actuates a pin 56 associated with the interchangeable lens aperture, to thereby stop down the lens aperture to the aperture diameter as set by the aperture preset ring 38.

At the same time, the rotation of the mirror left lever 4 lifts the mirror 49 of the mirror mechanism 60 away from the viewfinder's optical path while one end 2''' of the main lever 2 supporting the lever 4 actuates a lock lever 50 for the shutter. As a result, an unshown focal plane shutter is released to permit movement of a leading shutter curtain, whereupon a second exposure operating circuit 11 produces an output signal which provides the quantity of light from the object X the set exposure time = proper exposure time, which has previously been determined by the storage quantity of the capacitor C and the résistance value of the variable resistor 37. This output signal is applied through a conventional regeneration circuit 111 to a shutter control circuit 1V, which thus deenergized a trailing curtain holding magnet M2 to complete the exposure.

When the trailing curtain has completed its movement, the pawl 6 is unlocked by an unshown mechanism to return the automatic diaphragm of the interchangeable lens and the mirror 49 to their positions as shown in FIG. 1.

Since the light receiving element 53 is one of the TTL type which is disposed in the viewfinder's optical path, in the above-described sequence of operations, the unlocked release lever 1 permits upward movement of the mirror 49 to intercept the light from the object to be photographed. As a result, the light to the light receiving element 53 is intercepted during the operation of the electronic shutter. For this reason, the second exposure operating circuit is provided with storage means for pre-storing the quantity of light from the object.

The present embodiment is designed such that the quantity of light from the object is completely stored after the resistance value of the resistor 37 corresponding to the preset aperture has been determined. Therefore, after the exposure controlling resistance value of the resistor 37 has been determined, the interlocking lever 9 is unlocked and the pin 51 provided at one end of the lever 9 opens the switch S3 to complete the storage, and further movement of the interlocking lever actuates the pin 54, the stop-down lever 55 and the aperture-associated pin 56 to stop down the aperture to a preset value.

After the shutter release, the trailing shutter curtain is closed in accordance with a shutter speed corresponding to the resistance value of the resistor 37 which in turn corresponds to the preset aperture value. Therefore, even if the aperture preset ring 38 fails to provide a correct preset value due to various errors such as the meter needle error for the set shutter speed, a series of mechanical errors resulting from the erroneous stop position of the stop wheel 12, and an error with which the stop wheel 12 might be stopped electromagnetically as will be described, the storage type electronic shutter speed is set through the resistance value of the resistor 37 corresponding to the angularly rotated position of the aperture preset ring 38 and thus, the resultant exposure time is approximate to its set value to ensure a proper quantity of exposure to be effected on the film surface, as long as the manufacturing error is so small that there is little or no disparity between the aperture value set by the aperture preset ring 38 and the actual opening provided by the aperture blades of the interchangeable lens.

Description will now be made of the case where priority is given to the aperture. In FIG. 1, the aperture ring 41 is manually operated to displace the mark EE from the fixed index 100 and register a desired aperture value to the fixed index 100, whereupon the projection 41' of the aperture ring 41 actuates the pin 38" to rotate the preset ring 38 against the force of the spring 39. This causes another pin 38' on the aperture preset ring 38 to be upwardly displaced so that the pin 33 is moved by the force of a spring 410 (see FIG. 2) within the confines of of slot 15' formed in the sector gear 15. Thus, the signal lever 36 is rotated to cause the end 36' thereof to follow the pin 38' of the aperture preset ring 38, and in accordance with the angle of rotation of the signal lever, the brush 136 slides on the exposure time controlling variable resistor 37.

At the same time, a cam 41a provided on the ring 41 actuates a pin 41b and a lever 41c to rotate a lock lever 41d counter-clockwise about its pivot 41e, so that a pin 41f at one end of the lever 41d actuates to rotate the sector gear 10 clockwise through the agency of the lever 46 and spring 47 while the end 41g of the lever 41d completely restrains the clamp lever 11 from movement. Thus, upon the release of the release lever 1 operable in response to the operation of the shutter button, the sector gear 15 is not actuated but the projection 10' of the sector gear 10 is retracted from the path of one end 9" of the interlocking lever 9 to thereby permit the automatic stop-down, the mirror lifting and the like to take place normally. Thus, by the resistance value of the exposure time controlling variable resistor set in accordance with the amount of rotation of the aperture preset ring 38, a proper exposure time and a proper exposure are determined through the same process of operation as that described previously with respect to the case where priority is given to the shutter speed.

Figure 2:
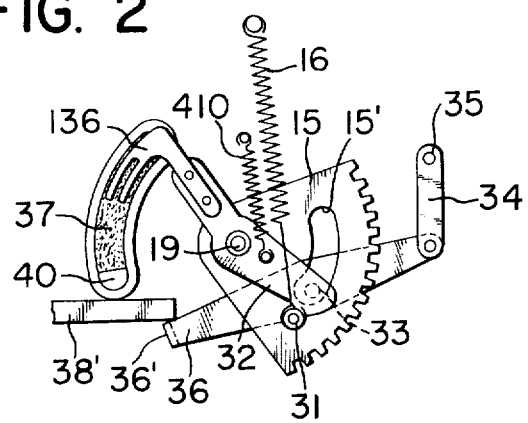
FIG. 2 is a front view showing an exposure time controlling variable resistor and adjacent portion of the FIG. 1 system.
Figure 4:
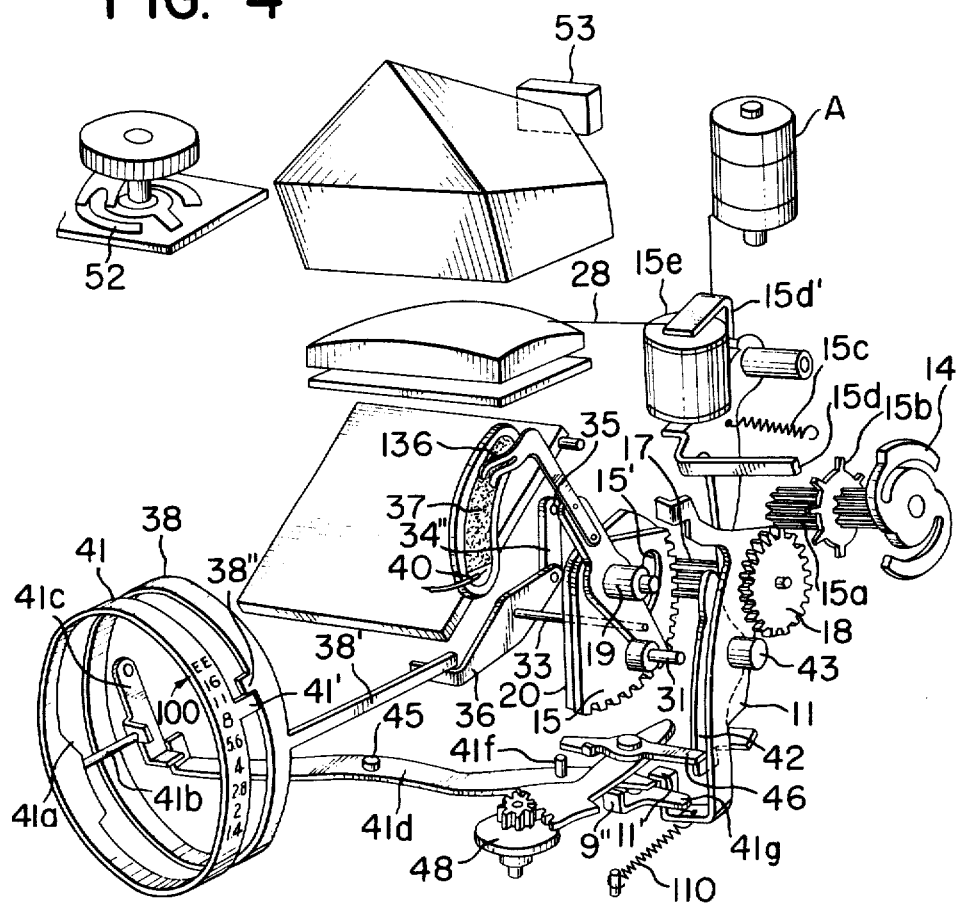
FIG. 4 is a perspective view of a single-lens reflex camera provided with the system according to a modified embodiment of the present invention.
Figure 5:
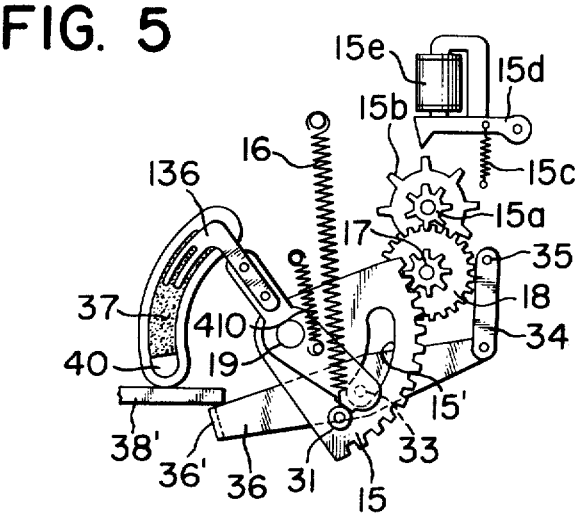
FIG. 5 is a front view showing an exposure time controlling variable resistor and adjacent portion of the FIG. 4 system.

The embodiment illustrated in FIGS. 1 and 2 is such that the deviated position of the meter needle 29 is mechanically detected, whereas FIGS. 4 and 5 show an embodiment in which the deviated position of the meter needle 29 is electromagnetically detected and controlled. In this embodiment, a pinion 15a formed integrally with a ratchet wheel 15b meshes with a gear 18 operatively connected to a sector gear 15 through a pinion 17, and a restraining pawl 15d controllable by an electromagnet 15e is provided in opposed relationship with the ratchet wheel 15b. The electromagnet 15e normally attracts the restraining pawl 15d to maintain the ratchet wheel 15b in free condition. When the magnet 15e is caused to lose its attraction by an output signal representing a proper exposure value from a first exposure operating circuit, the restraining pawl 15d is pulled by a spring 15c into engagement with the ratchet wheel 15b, thereby discontinuing the rotation of the sector gear 15 and thus of an aperture preset ring 38 at a position corresponding to the proper exposure value. At this moment, the arm 15d of the restraining pawl 15d and the top surface of the electromagnet 15e hold a meter needle 28 therebetween to determine the deviated position of the needle.

Figure 6:
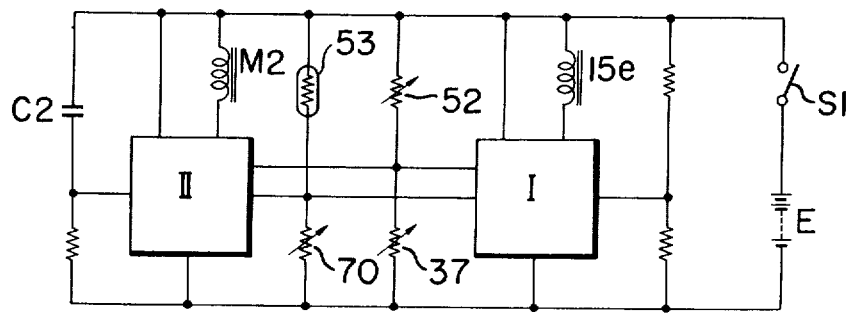
FIG. 6 is a diagrammatic representation of the control network for the mechanism shown in FIG. 4.

FIG. 6 shows a control network for the embodiment shown in FIG. 4. The magnet 15e for detecting the deviated position of the meter needle is connected to a first exposure operating circuit 1, and a light receiving element 53, an exposure time setting variable resistor 52, a film sensitivity setting variable resistor 70 and an exposure time controlling variable resistor 37 are connected in a bridge fashion. Thus, as the resistance value of the variable resistor 37 is varied with rotation of the sector gear 15, the first exposure operating circuit 1 produces an output signal during the balanced condition of the bridge circuit and in response thereto, the magnet 15e is caused to lose its attraction. As a result, the ratchet wheel 15b is stopped by the restraining pawl 15d, whereupon the resistance value of the variable resistor 37 provides a resistance value representing a proper aperture. This resistance value provides an input to a second exposure operating circuit 11, which controls when an electromagnet M2 for holding the trailing shutter curtain is to be deenergized. Of course, the input resistance 37 for the first exposure operating circuit 1 and the input resistance for the second exposure operating circuit 11 may be provided discretely.

With the above-described construction of the present invention, it is possible, in a fully-open aperture TTL metering type single-lens reflex camera using an interchangeable lens, to preset an exposure time and automatically control the aperture in accordance therewith, and control the exposure time in accordance with the controlled aperture value to thereby provide a proper exposure for the preset exposure time or for an exposure time approximate thereto.

Therefore, if the preset exposure time is erroneous with respect to the then quantity of light from the object to be photographed, the exposure time may be automatically corrected to ensure a proper exposure. For example, in the case of an object whose brightness is low enough to necessitate a maximum $f$-value F1.4 and exposure time ¼ sec. for a proper exposure, if now the photographer has set the exposure time to 1/15 sec., the objective lens must have its aperture opened to two steps above F1.4. However, since F1.4 is the maximum aperture for the objective lens in use, it is impossible to open the aperture preset ring 38 wider than the maximum opening 1.4. Thus, the exposure time controlling variable resistor 37 remains at the resistance value corresponding to F1.4, and in accordance with this resistance value, the exposure time is automatically changed to ¼ sec. which is two steps slower than 1/15 sec., thereby providing a proper exposure.

Conversely, in the case of an object whose brightness is so high that a minimum $f$-value F16 and exposure time 1/500 sec. are required for a proper exposure, if the photographer has set the exposure time to 1/125 sec., the aperture preset ring 38 is automatically set to the minimum $f$-value F16 and, in accordance with the resistance value of the variable resistor 37 for the minimum f-value F16, the exposure time is automatically changed to 1/500 sec. which is two steps faster than 1/125 sec., thus providing a proper exposure.

In other words, where a proper exposure cannot be provided by the preset aperture value alone, control is effected so that the preset aperture value forms one of the factors for providing an exposure so that an exposure time for proper exposure may be automatically provided.

Further, the present invention is also usable where priority is given to the aperture. This may be done by manually operating the aperture ring 41 to vary the resistance value of the exposure time controlling variable resistor and obtaining a proper exposure through the second exposure operating circuit in accordance with the resistance value of the variable resistor and with the quantity of light from the object to be photographed. In this case, it is apparent that the proper exposure is obtainable irrespective of the resistance value of the exposure time controlling variable resistor 52 in FIG. 3. Furthermore, it is possible to provide a mark "A" (Auto) on the adjust dial for the variable resistor 52 and use it in combination with the preset aperture scale on the lens. It is also possible to combine the manual setting scale of the aperture ring 41 with the aforesaid manual setting of the adjust dial and use the resistor 52 in lieu of the light receiving element 53 with the aid of a change-over switch, thereby providing a so-called manual set type camera.

We claim:

1. An exposure control system in a single-lens reflex type photographic camera which comprises in combination:
   a. an interchangeable lens provided with an aperture preset device;
   b. a light receiving means for metering light through the fully open aperture of said interchangeable lens;
   c. a first exposure operating circuit;
   d. a second exposure operating circuit;
   e. an exposure control circuit including a storage circuit and an aperture information input element; and
   f. an automatic aperture mechanism;
   g. said first exposure operating circuit constituting means for controlling the automatic aperture mechanism in accordance with a preset exposure time and with the quantity of light from an object to be photographed received by said light receiving means to preset an aperture value and, simultaneously therwith, changing the value of said information input element so as to correspond to said aperture value;
   h. said second exposure operating circuit constituting means for causing said storage to store an electrical quantity corresponding to said quantity of light from said object and for controlling the exposure time in accordance with the output of said storage circuit and the value of said information input element as set by said first exposure operating circuit:
   i. said aperture information input element comprising a variable resistor, and
   j. said entire system further including lock means for said automatic aperture mechanism, said lock means being adapted to lock said automatic aperture mechanism when said aperture preset device is manually operated, to thereby vary the resistance value of said variable resistor in accordance with the amount of rotation of an aperture preset member, whereby said second exposure operating circuit controls the exposure time.

2. An exposure control system in a single-lens reflex camera having an interchangeable lens provided with an aperture preset device and an exposure control device, said exposure control device comprising:
   a. a first exposure operating circuit having a light receiving element for metering light passing through the fully opened aperture of said interchangeable lens and shutter speed setting means;
   b. an automatic aperture mechanism controlling the aperture preset device of the interchangeable lens in accordance with the output of said first exposure operating circuit;
   c. a second exposure operating circuit having storage means to store the quantity of light received by the light receiving element and having aperture value setting means responsive to said automatic aperture mechanism;
   d. said first exposure operating circuit constituting means for controlling the automatic aperture mechanism in response to the shutter speed set by said shutter speed setting means and the brightness of the object metered by the light receiving element so as to preset the aperture of the interchangeable lens and for also controlling the aperture value setting means of the second exposure operating circuit, and
   e. said second exposure operating circuit constituting means for determining the exposure time in response to the brightness of the object stored by said storage means and the aperture value set by said aperture value setting means.

* * * * *